(12) United States Patent
Rangan et al.

(10) Patent No.: US 12,238,645 B2
(45) Date of Patent: *Feb. 25, 2025

(54) SWITCHED ANALOG-DIGITAL ARCHITECTURE FOR WIRELESS ANTENNA ARRAYS AND METHODS FOR USE THEREOF

(71) Applicant: NEW YORK UNIVERSITY, New York, NY (US)

(72) Inventors: Sundeep Rangan, Jersey City, NJ (US); Theodore S. Rappaport, Riner, VA (US); Dennis Shasha, New York, NY (US)

(73) Assignee: New York University, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/545,098

(22) Filed: Dec. 19, 2023

(65) Prior Publication Data

US 2024/0244523 A1 Jul. 18, 2024

Related U.S. Application Data

(63) Continuation of application No. 15/093,326, filed on Apr. 7, 2016, now Pat. No. 11,889,413.

(Continued)

(51) Int. Cl.
*H04W 52/02* (2009.01)
*H04B 7/04* (2017.01)
*H04B 7/06* (2006.01)

(52) U.S. Cl.
CPC ...... *H04W 52/0209* (2013.01); *H04B 7/0686* (2013.01); *H04B 7/04* (2013.01); *Y02D 30/70* (2020.08)

(58) Field of Classification Search
CPC ...... H04B 7/0686; H04B 7/04; H04B 1/3805; H04B 7/0617; H04L 27/38
See application file for complete search history.

(56) References Cited

U.S. PATENT DOCUMENTS

2010/0027702 A1* 2/2010 Vijayan .......... H04L 27/38
375/267
2015/0212197 A1* 7/2015 Morita .......... G01S 13/10
342/92

(Continued)

*Primary Examiner* — Yee F Lam
(74) *Attorney, Agent, or Firm* — WCF IP

(57) ABSTRACT

Exemplary apparatus can be provided that can comprise a plurality of antennas; a plurality of conversion systems, each capable of accepting and/or producing one or more digital signals; a circuit (e.g., radio circuit) configured to couple the antennas to the conversion systems; and computer arrangement configurable to selectively control operation of the conversion systems according to one or more predetermined criteria. In some embodiments, the conversion systems can be configured to utilize different sampling rates and/or quantization resolutions and/or to accept and/or produce different numbers of digital signals. Exemplary conversion systems can be enabled/disabled such that one or more can operate simultaneously based on, e.g., subframe timing of received signal, predetermined schedule, power or energy of s, availability of reference signals, channel coherence time, and apparatus energy consumption. Further, exemplary methods and computer-readable media can be provided embodying one or more procedures the apparatus is configured to perform.

9 Claims, 6 Drawing Sheets

Related U.S. Application Data

(60) Provisional application No. 62/143,865, filed on Apr. 7, 2015.

(56) References Cited

U.S. PATENT DOCUMENTS

| | | | |
|---|---|---|---|
| 2017/0026205 A1* | 1/2017 | Agee | H04W 28/14 |
| 2019/0207636 A1* | 7/2019 | Luo | H01Q 3/36 |

* cited by examiner

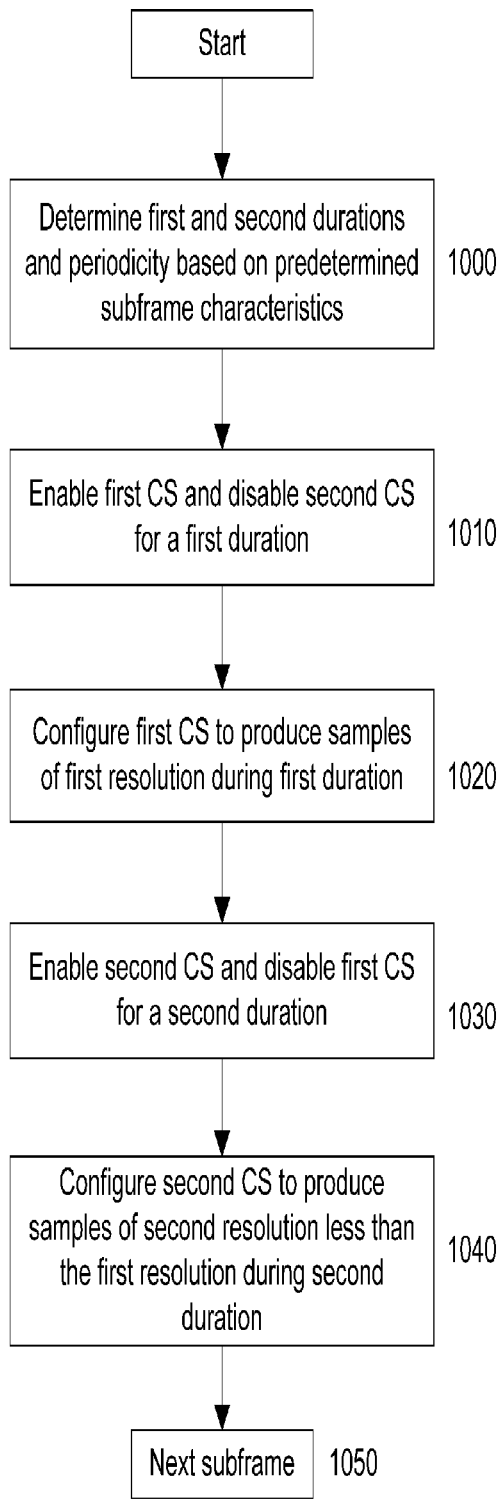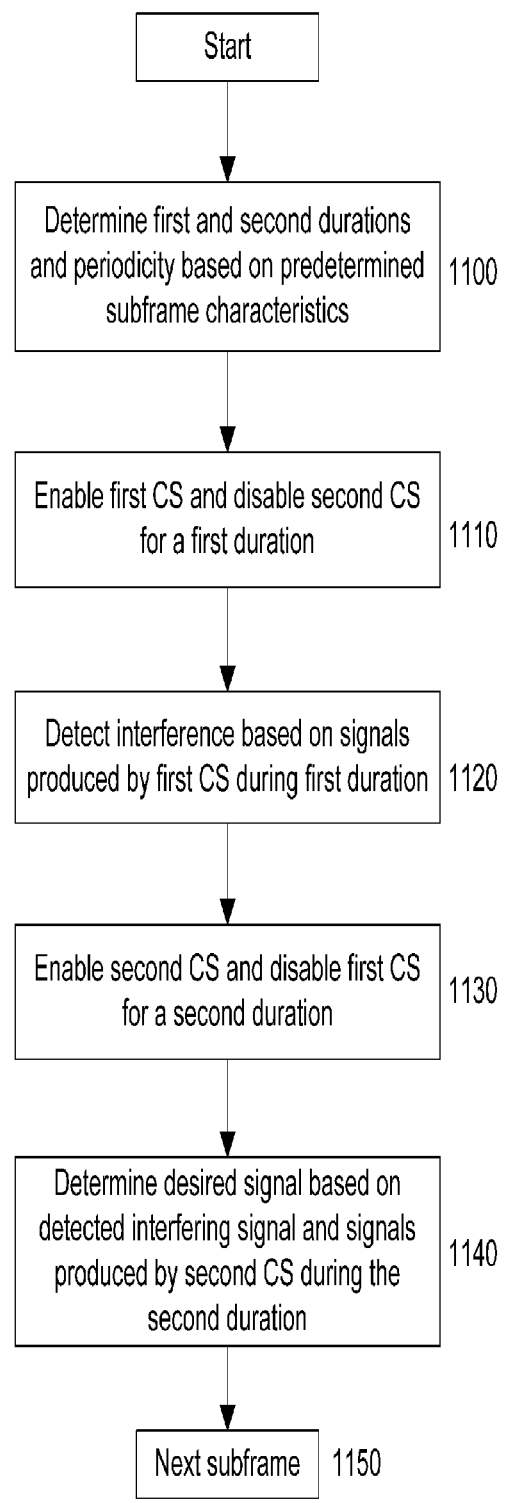
Figure 10
Figure 11

SWITCHED ANALOG-DIGITAL ARCHITECTURE FOR WIRELESS ANTENNA ARRAYS AND METHODS FOR USE THEREOF

CROSS-REFERENCE TO RELATED APPLICATION(S)

This application is a continuation application of U.S. Ser. No. 15/093,326 filed on Apr. 7, 2016, now U.S. Pat. No. 11,889,413. U.S. Ser. No. 15/093,326 was based upon and claims the benefit of priority from U.S. Patent Application Ser. No. 62/143,865, filed on Apr. 7, 2015, the entire disclosure of which is incorporated herein by reference.

FIELD OF THE DISCLOSURE

The present application relates generally to the field of wireless communication systems, and more specifically to systems, methods, configurations and apparatus for improving the performance of wireless communication transmitters and/or receivers utilizing arrays of antenna elements (e.g., an M-by-N antenna array, where $M \geq 1$ and $N > 1$) by providing a flexible analog-to-digital (e.g., for a receiver) and/or digital-to-analog (e.g., for a transmitter) conversion architecture that is switchable according to the operating requirements of the transmitter and/or receiver.

BACKGROUND INFORMATION

Wireless communication has evolved rapidly in the past decades as a demand for higher data rates and better quality of service has been continually required by a growing number of end users. Next-generation systems are expected to operate at higher frequencies (e.g., millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directive antennas can also ensure better wireless links as a mobile or fixed devices experiences a time-varying channel.

In order to achieve many of these exemplary performance improvements, however, multi-antenna mmW systems generally place difficult performance requirements on the analog-to-digital (A/D, e.g., for receiver) and/or digital-to-analog (D/A, e.g., for transmitter) converters employed in conjunction with the array of antennas. For example, A/D and D/A power (or energy) consumption generally increases in linear proportion with the sampling rate and exponentially with respect to the quantization resolution (e.g., number of bits per A/D or D/A sample, also referred to herein as "resolution" or "quantization rate"). Since mmW antenna arrays can transmit and receive data across very wide bandwidths over large number of antennas, employing a high sampling rate, high-resolution A/D and/or D/A on every antenna element may not be feasible from an energy consumption or cost standpoint, particularly in mobile devices. Moreover, the complexity and energy consumption increases in proportion to both the operating frequency of the system and the number of antennas in the transmitting and/or receiving antenna arrays.

Thus, it can be beneficial to address at least some of the issues and problems identified herein above.

SUMMARY OF EXEMPLARY EMBODIMENTS

Accordingly, to address at least some of such issues and/or problems, certain exemplary embodiments of apparatus, devices, methods, and computer-readable media according to the present disclosure can utilize a switchable architecture of multiple conversion systems with various advantageous characteristics that coupled to a plurality of antennas, e.g., an antenna array. For example, exemplary embodiments of methods, systems, devices, and computer-readable media according to the present disclosure can vastly out-perform conventional methods, techniques and systems in various known applications, including exemplary applications discussed herein.

In certain exemplary embodiments of the present disclosure, it is possible to provide an apparatus or device comprising a plurality of antennas; a plurality of conversion systems configured to at least one of: accept one or more digital signals or produce one or more digital signals; a circuit configured to couple the antennas to the conversion systems, wherein at least one of the antennas is coupled to more than one of the conversion systems; and a computer arrangement configurable to selectively control operation of the conversion systems according to one or more predetermined criteria. In exemplary embodiments, a first one of the conversion systems is configured to utilize at least one of a sampling rate or a quantization resolution that is different than at least one of a further sampling rate or a further quantization resolution that a second one of the conversion systems is configured to utilize. In exemplary embodiments, a first one of the conversion systems is configured to at least one of accept or produce a first number of digital signals that is different than a second number of digital signals that a second one of the conversion systems is configured to at least one of accept or produce. In exemplary embodiments, the computer arrangement can enable and disable conversion systems such that one or more can operate simultaneously based on factors such as, e.g., subframe timing of a received signal, a predetermined schedule, power or energy of a received signal, availability of reference signals, channel coherence time, and energy consumption of the apparatus. Other exemplary embodiments include methods and computer-readable media embodying one or more of the procedures that the apparatus is configurable to perform.

In exemplary embodiments, the circuit comprises one or more splitters, the conversion systems comprise a plurality of receive conversion systems, and each of the receive conversion systems comprises one or more analog-to-digital converters. In other exemplary embodiments, the circuit comprises one or more combiners, the conversion systems comprise a plurality of transmit conversion systems, and each of the transmit conversion systems comprises one or more digital-to-analog converters.

According to other exemplary embodiments of the present disclosure, a computer-implemented method can be provided for operating first and second conversion systems, with each conversion system being coupled to a plurality of antennas. The exemplary method can comprise selectively enabling the first conversion system and selectively disabling the second conversion system for a first duration; selectively disabling the first conversion system and selectively enabling the second conversion system for a second duration; configuring the first conversion system to produce a digital signal comprising samples of a first resolution; and configuring the second conversion system to produce a plurality of digital signals comprising samples of a second resolution less than the first resolution. Non-transitory, computer-readable media comprising computer-executable instructions corresponding to the computer-implemented method according to further exemplary embodiments of the present disclosure can also be provided.

In other exemplary embodiments of the present disclosure, a computer-implemented method for operating first and second conversion systems can be provided, with each conversion system being coupled to a plurality of antennas. The exemplary method can comprise: selectively enabling the first conversion system and selectively disabling the second conversion system for a first duration; selectively disabling the first conversion system and selectively enabling the second conversion system for a second duration; configuring the first conversion system to produce a digital signal comprising samples of a first resolution; and configuring the second conversion system to produce a plurality of digital signals comprising samples of a second resolution less than the first resolution. Non-transitory, computer-readable media comprising computer-executable instructions corresponding to the computer-implemented method according to further exemplary embodiments of the present disclosure can also be provided.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which:

FIG. 10 is a flow diagram of an exemplary method and/or procedure for operating a switchable architecture comprising first and second conversion systems (CS), according to one or more exemplary embodiments of the present disclosure; and FIG. 11 is a flow diagram of another exemplary method and/or procedure for operating a switchable architecture comprising first and second conversion systems (CS), according to one or more exemplary embodiments of the present disclosure.

Figure 1:
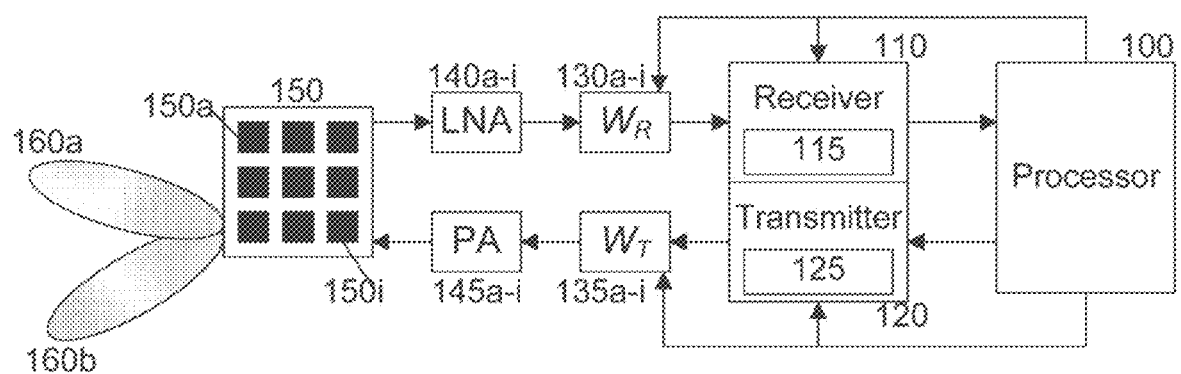
FIG. 1 is a block diagram of an exemplary apparatus and/or device according to one or more exemplary embodiments of the present disclosure.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

An important characteristic of any multi-antenna configuration can be or include a distance between the different antenna elements due to the relation between the antenna distance and the mutual correlation between the radio-channel fading experienced by the signals at the different antennas. In general, the mutual correlation can be proportional to the relative spacing between the antennas. This exemplary spacing or distance can be often expressed in terms of the wavelength, $\lambda$, of the radio signal to be transmitted and/or received (e.g., $\lambda/4$ spacing). Another way to achieve low mutual fading correlation can be to apply different polarization directions for the different antennas. For example, by using different polarization directions, the antennas can be located relatively close to one another in a compact array while still experiencing low mutual fading correlation.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas can/should have low mutual correlation, e.g., a sufficiently large antenna spacing ("spatial diversity") and/or different polarization directions ("polarization diversity"). Historically, common multi-antenna configurations have implemented multiple antennas at the receiver side, which is commonly referred to as "receive diversity." Alternately and/or in addition, multiple antennas can be used in the transmitter to achieve transmit diversity. For example, a multi-antenna transmitter can achieve diversity even without knowledge of the channels between the transmitter and the receiver, so long as there is low mutual correlation between the respective channels of the transmit antennas.

In various wireless communication systems, such as cellular systems, there can be fewer constraints on the complexity of the base station compared to the terminal or mobile unit. In such exemplary cases, transmit diversity can be feasible in the downlink (i.e., base station to terminal) only and, in fact, can provide a means to simplify the receiver in the terminal. In the uplink (i.e., terminal to base station) direction, due to a complexity of multiple transmit antennas, it can be preferable to achieve diversity by using a single transmit antenna in the terminal multiple receive antennas at the base station.

According to certain exemplary embodiments, multiple antennas at the transmitter and/or the receiver can be used to shape or "form" the overall antenna beam (e.g., transmit and/or receive beam, respectively) in a particular way, with the general goal being to improve the received signal-to-interference-plus-noise ratio (SINR) and, ultimately, system capacity and/or coverage. This can be accomplished, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary embodiments, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such exemplary cases, using multiple antennas at both the transmitter and receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

In order to achieve these performance gains, MIMO can provide that both the transmitter and the receiver have knowledge of the channel from each transmit antenna to each receive antenna. According to particular exemplary embodiments, this can be done by the receiver measuring the amplitude and phase of a known transmitted data symbol (e.g., a pilot symbol) and sending these measurements to the transmitter as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other metrics known by persons of ordinary skill. As used herein, "multipath component" can describe, but is not limited to, any resolvable signal component arriving at a receiver or incident on an antenna array at the receiver. For example, the multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In order to achieve many of these exemplary performance improvements and to mitigate many of these difficult operational conditions, however, multi-antenna mmW systems can generally place difficult performance requirements on the analog-to-digital (A/D, e.g., for a receiver) and/or digital-to-analog (D/A, e.g., for a transmitter) converters employed in conjunction with the array of antennas. As a consequence of the practical limitations, three exemplary A/D and D/A architectures are described for systems utilizing mmW antenna arrays.

In one such exemplary architecture, e.g., a low-resolution digital architecture, the signal from (or to) each antenna element or element cluster is processed by an individual A/D (or D/A) converter. This exemplary architecture can be flexible because it is able to support an arbitrary number of spatial streams and can also provide spatial division multiplexing to communicate to multiple devices simultaneously. However, this architecture can be prohibitive in energy consumption, particularly if the A/D and/or D/A converters are run at a high sampling rate and/or a high quantization resolution. Consequently, such architectures typically are operated at lower sampling rate and/or lower quantization resolution to compensate for the larger number of A/D and/or D/A converters.

In another exemplary architecture, e.g., a high-resolution analog architecture, the analog signals from (or to) the antenna elements are first combined by an analog phased array, either at radio frequency (RF) or at intermediate frequency (IF, e.g., before or after the mixer). The combined signal can then be processed by a single A/D (or D/A) converter. Since this design requires only one A/D or D/A, it uses less energy compared to the fully digital approach and therefore can be run at a much higher quantization resolution. However, the analog architecture has the limitation that the phased array can be oriented in only one direction at a time, thereby limiting the multiple access and searching capabilities.

In a third exemplary architecture, e.g., a hybrid beam-steering architecture, the collection of antenna elements is divided into a plurality of clusters. Signals from all antenna elements in a cluster are combined into a single analog signal, which is then individually digitized with a single A/D converter. In the transmit direction, a single D/A generates a composite analog signal that is then split into multiple signals, each fed to a particular antenna element of the cluster. This architecture is a compromise in both performance and energy consumption between the high-resolution analog and the low-resolution digital architectures. This architecture has been advocated for future millimeter wave wireless systems, as described by A Ghosh, et. al., "Millimeter-Wave Enhanced Local Area Systems: A High-Data-Rate Approach for Future Wireless Networks," IEEE JSAC, June 2014. A related architecture is described by Alkhateeb et al., "Hybrid Precoding for Millimeter Wave Cellular Systems with Partial Channel Knowledge," Proc. 2013 IEEE Workshop on Information Theory and Applications.

Neither the low-resolution digital architecture nor the high-resolution analog architecture can be optimal for all scenarios in mobile wireless (e.g., cellular) applications. Moreover, the hybrid beamstearing architecture is inherently suboptimal for certain scenarios, since the determination of how to cluster antenna elements and the number of operational A/D and/or D/A elements are not configurable. For example, when searching for other wireless peers or tracking of the signals from those peers, a low-resolution digital architecture may offer greatly improved performance over a high-resolution analog architecture because it allows all directions to be scanned at once. The low quantization resolution on each antenna signal generally does not affect the performance since the signals are limited by thermal noise and interference rather than quantization noise. A similar situation can occur for transmitting and receiving control signals or any other signals that are designed for a low signal-to-noise ratio (SNR). One example has been described in Barati, et al, "Directional Cell Search for Millimeter Wave Cellular Systems", Proc. IEEE SPAWC, 2014.

In contrast, during steady-state data reception and transmission, the high-resolution analog architecture can be preferable. In such exemplary scenario, the direction of communication has generally already been established (or at least is changing relatively slowly) and the array of antenna elements can be oriented in a single direction. The high quantization resolution is useful to enable transmission and reception at higher SNRs.

It is therefore desirable for a single architecture to support be able to support multiple approaches for analog/digital conversion, depending on the task required at a specific time with the ability to adjust the quantization rate or number of A/D and/or D/A converters. Exemplary embodiments according to the present disclosure can provide such advantages via, e.g., a switchable architecture comprising a plurality of conversion systems, each comprising one or more A/D and/or D/A converters. Operational exemplary parameters of the various conversion systems (e.g., sampling rate, quantization resolution, on/off time, etc.) can be configured such that one of the plurality of conversion systems can be preferable for each task required at a specific time. For example, one exemplary conversion system can use a high-resolution analog architecture, a second exemplary system can use a low-resolution digital architecture, and a third exemplary conversion system can use a hybrid beamforming architecture. Each exemplary conversion system can be separately enabled or disabled, or be adaptively adjusted in groups or across all the conversion systems, thereby providing various advantages including a reduction of energy consumption and a higher signal to noise ratio.

FIG. 1 shows a block diagram of an exemplary apparatus and/or device according to one or more embodiments of the present disclosure. The exemplary apparatus shown in FIG. 1 can also include, e.g., an antenna array 150 that can comprise a plurality of individual antenna elements arranged in a particular pattern, such as, e.g., exemplary antenna elements 150a to 150i arranged in an exemplary 3-by-3 grid. In some exemplary embodiments, the antenna array 150 can be arranged as an M-by-N array of elements, where M≥1 and N>1. In some exemplary embodiments, the antenna elements 150a to 150i can be arranged in a rectangular grid with equal spacing in one or both dimensions; however, other exemplary arrangements of the elements comprising the array are possible and are within the scope of the present disclosure. In addition, each element of the antenna array 150 can have various physical forms including dipole, patch, cross dipole, inverted F, inverted L, helix, Yagi, rhombic, lens, and/or any another type of antenna topology known to persons of ordinary skill. Elements 150a to 150i can utilize various polarization patterns known to persons of ordinary skill, including horizontal, vertical, circular, and cross polarization. In some exemplary embodiments, elements 150a to 150i—as well as their arrangement in the array 150—can be designed or configured especially for the particular operating frequency (e.g., 5 GHZ, 10 GHz, 300 GHZ, etc.) and device (e.g., a mobile terminal, cell phone, handset, laptop, tablet, access point, base station, etc.) in which the exemplary apparatus of FIG. 1 can be used.

In some exemplary embodiments, the antenna elements 150a to 150i can be used for receiving and/or transmitting signals in combination with, respectively, other receiving and transmitting circuitry comprising the exemplary apparatus. The receiving circuitry can comprise a plurality of low-noise amplifiers (LNAs) 140a through 140i, each of which amplifies a signal received from a corresponding antenna element 150a through 150i. The exemplary apparatus can further comprise a plurality of receive gain/phase controls 130a through 130i, each of which can receive a signal output from a corresponding (LNAs) 140a through 140i. In some exemplary embodiments, the receive gain/phase control 130 can comprise a receiver beamformer that can be controlled by, e.g., one or more processors 100. The outputs of the receive gain/phase controls 130a through 130i are provided to a receiver block 110, which can comprise a receive conversion block 115, as described in more ¶below. The inputs to block 110 can be at a particular radio frequency (RF), in which case block 110 can comprise circuitry configurable to translate the signals to an intermediate frequency (IF). Nevertheless, the skilled person will readily comprehend that RF-to-IF conversion can alternately occur prior to the signals reaching receiver block 110. As indicated herein, references to "processor" should be understood to mean one or more processors, including one or more computer processors.

The output of block 115 can comprise one or more streams of digitized samples that are provided to processor 100, which can provide one or more receiver control signals for controlling various operational aspects of, e.g., receive gain/phase controls 130a through 130i, receive conversion block 115, etc. Similarly, processor 100 can provide one or more streams of digitized samples to transmitter block 120, which can comprise a transmit conversion block 125. The output of block 120 (e.g., the output of transmit conversion block 125) can comprise a plurality of analog signals, each of which can be at RF or IF, as described above for the receiving circuitry. Each of the analog signals output by transmitter block 120 can be applied to a corresponding transmit gain/phase control 135a through 135i. Processor 100 can also provide one or more transmitter control signals for controlling various operational aspects of, e.g., transmit gain/phase controls 135a through 135i, transmit conversion block 125, etc. In some exemplary embodiments of the present disclosure, transmit gain/phase control 135 can comprise a transmit beamformer that can be controlled by, e.g., processor 100. Each of the signals output by transmit gain/phase control 135a through 135i can be applied to a corresponding transmit power amplifier (PA) 145a through 145i. The amplified outputs of the PAs can be applied to respective corresponding antenna array elements 150a through 150i.

In some exemplary embodiments of the present disclosure, processor 100 can utilize a direction-of-arrival estimate to determine appropriate weights (e.g., $W_R$ or $W_T$) to cause the antenna array 150 to produce one or more beam patterns corresponding to the estimated direction of arrival. For example, as shown in FIG. 1, by applying the appropriate weights (e.g., $W_R$ or $W_T$) to the signals received from the antenna elements 150a through 150i, the antenna array 150 can capture signals and/or multipath components that are incident in the directions of arrival corresponding to beams 160a and 160b while rejecting signals and/or multipath components that are incident other directions of arrival. Processor 100 can program and/or configure receive gain/phase controls 130 and/or transmit gain/phase controls 135 with weights (e.g., $W_R$ or $W_T$, respectively) corresponding to the estimated direction of arrival. Processor 100 can determine weights using various beamsteering or beam-forming algorithms know to persons of ordinary skill, including parametric algorithms and codebook-based algorithms. In various exemplary embodiments of the present disclosure, receive gain/phase controls 130 and/or transmit gain/phase controls 135 can comprise one or more programmable amplifiers that modifies the amplitude and/or phase of the signals (e.g., at RF or IF) from the array elements 150a through 150i. When no gain or phase adjustment of the signals to/from array elements 150a through 150i is required, the processor 100 can program the respective elements of controls 130 and/or 135 to unity gain and zero phase.

In various exemplary embodiments of the present disclosure, processor 100 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 100 can be programmable and/or configured to perform the functions described herein by executable software code stored in an accessible memory or other type of computer-readable medium. In some exemplary embodiments of the present disclosure, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can be capable of having the executable software code downloaded and/or configured.

Figure 2A:
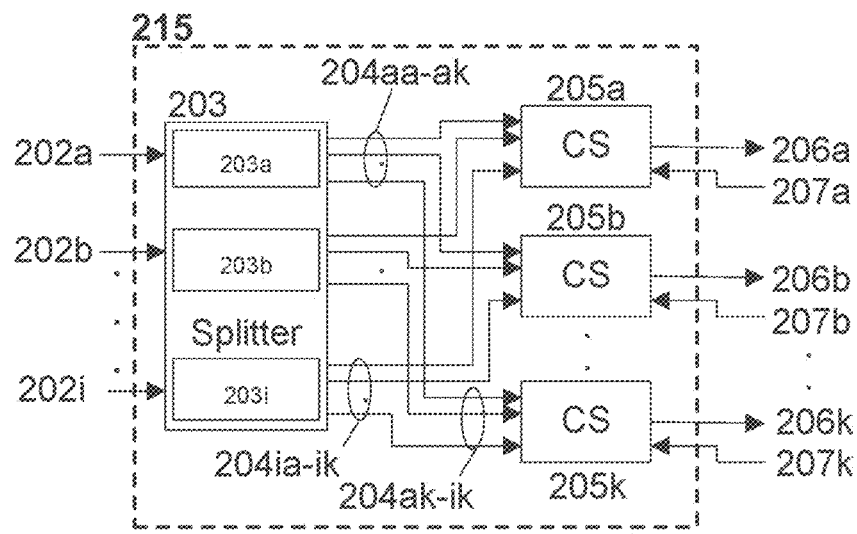
FIGS. 2a and 2b are block diagrams of exemplary receive and transmit conversion blocks, respectively, according to one or more embodiments of the present disclosure.

FIG. 2a shows a block diagram of an exemplary receive conversion block 215, according to one or more exemplary embodiments of the present disclosure. In some exemplary embodiments, receive conversion block 215 can be utilized as receive conversion block 115 in FIG. 1. Block 215 can receive a plurality of input signals 202a through 202i, which in some embodiments can correspond to signals output by receive gain/phase controls 130a through 130i, respectively, in FIG. 1. Each of signals 202a through 202i is applied to a corresponding splitter block 203a through 203i of splitter 203. Each splitter block can split the corresponding input signal into k output signals, which in some exemplary embodiments can be substantially similar in power or energy level. For example, splitter block 203a can split signal 202a into signals 204aa through 204ak, each of which is input to a corresponding conversion system (CS) 205a through 205k. As shown in FIG. 2a, each CS 205a through 205k can receive a signal from each of the splitter blocks 203a through 203i; for example, CS 205k can receive signals 204ak through 204ik. There can be a total of i times k signals between splitter 203 and the conversion systems.

In some exemplary embodiments, a particular splitter can provide one or more of the k output signals via an output port that is substantially isolated from one or more other signals output by that particular splitter (e.g., by one or more other output ports), such that any power reflected from the terminations of the one or more signals (e.g., signal 204aa at CS 205a) does not affect the one or more other signals output by that splitter (e.g., signals 204ab through 204ak). In other exemplary embodiments, one or more of the k output signals from a particular splitter can be non-isolated from one or more other signals output by that splitter, e.g., a single splitter output port can provide input signals to a plurality of CS.

Each CS 205a through 205k can output a corresponding digital sample stream 206a through 206k, respectively. Each sample stream can comprise a plurality of individual streams of samples, as described in more detail below. The outputs 206a through 206k can be provided, for example, to a digital processor such as processor 100 shown in FIG. 1. In addition, each CS 205a through 205k receives one or more corresponding control signals 207a through 207k respectively, that can be utilized to control various operational parameters of the respective CS block including, e.g., independently enabling and/or disabling each CS block. Such exemplary control signals can be provided, e.g., by a digital processor such as processor 100.

Figure 2B:
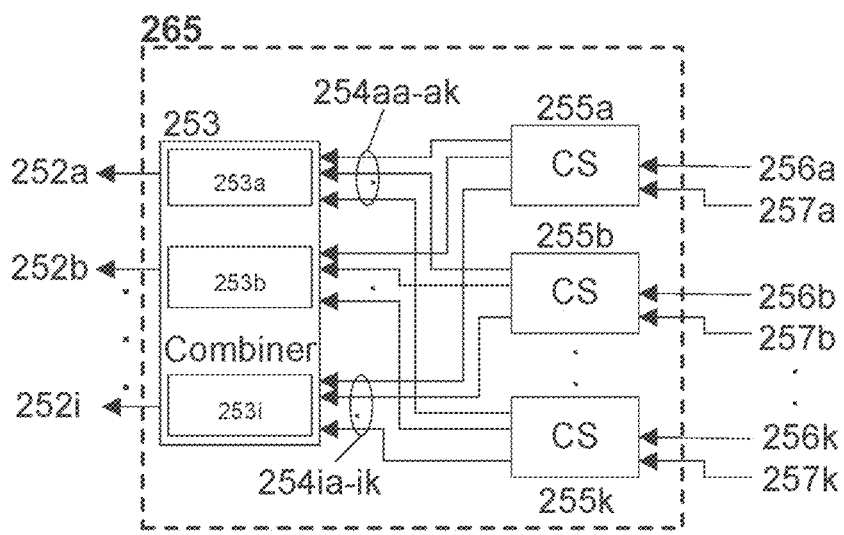

FIG. 2b shows a block diagram of an exemplary transmit conversion block 265, according to one or more embodiments of the present disclosure. In some exemplary embodiments, transmit conversion block 265 can be utilized as transmit conversion block 125 in FIG. 1. Each transmit conversion system (CS) 255a through 255k can receive a corresponding digital sample stream 256a through 256k, respectively. Each sample stream can comprise one or more individual streams of samples, as described in more detail below. The inputs 256a through 256k can be provided, for example, by a digital processor such as processor 100 shown in FIG. 1. In addition, each CS 255a through 255k can receive one or more corresponding control signals 257a through 257k, respectively, that can be utilized to control various operational parameters of the respective CS block including, e.g., independently enabling and/or disabling each CS block. Such control signals can be provided, e.g., by a digital processor such as processor 100.

As shown in FIG. 2b, each CS 255a through 255k can provide a signal to each of the combiner blocks 253a through 253i, such that there are a total of i times k signals between combiner 253 and the conversion systems 255. For example, CS 255a can provide signals 254aa through 254ia, CS 255b can provide signals 254ab through 254ib, etc., and in an embodiment there may be overlaps in the providing of the signals. Viewed another way, combiner block 253a can receive signals 254aa through 254ak, combiner block 253b can receive signals 254ba through 254bk, etc. Each of the combiner blocks (e.g., 253a) can combine all received input signals (e.g., 254aa through 254ak) and/or output a combined signal (e.g., 252a). As shown in FIG. 2b, each CS 255a through 255k can provide a signal to each of the combiner blocks 253a through 253i, such that there are a total of i times k signals between combiner 253 and the conversion systems 255. For example, CS 255a can provide signals 254aa through 254ia, CS 255b can provide signals 254ab through 254ib, etc., and in an embodiment there may be overlaps in the providing of the signals. Viewed another way, combiner block 253a can receive signals 254aa through 254*ak*, combiner block 253*b* can receive signals 254*ba* through 254*bk*, etc. Each of the combiner blocks (e.g., 253*a*) can combine all received input signals (e.g., 254*aa* through 254*ak*) and/or output a combined signal (e.g., 252*a*).

In some exemplary embodiments, a particular CS can provide one or more of the i output signals via an output port that is substantially isolated from one or more other signals output by that particular CS (e.g., by one or more other output ports), such that any power reflected from the terminations of one signal (e.g., signal 254*aa* at combiner 253*a*) does not affect the other signals output by that CS (e.g., signals 254*ba* through 254*ia*). In other exemplary embodiments, one or more of the i output signals from a particular CS can be non-isolated from one or more other signals output by that CS, e.g., a single CS output port can provide input signals to a plurality of combiners.

Figure 3A:
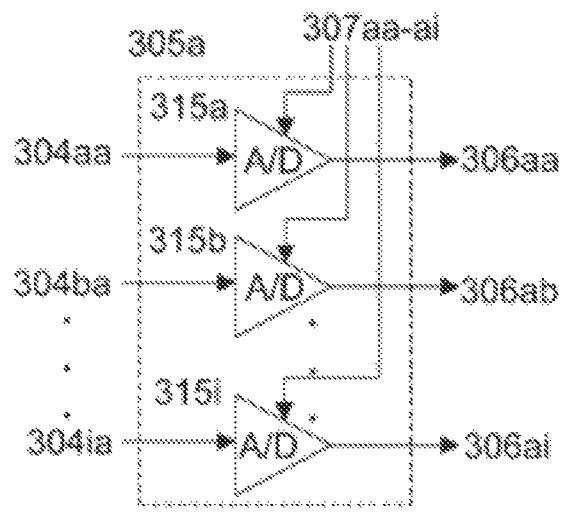
FIGS. 3a and 3b are schematic diagrams of exemplary receive and transmit conversion systems, respectively, according to one of more exemplary embodiments of the present disclosure.
Figure 3B:
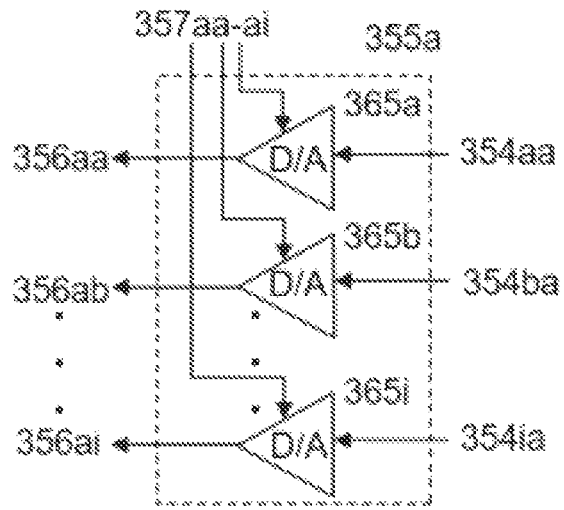

FIG. 3 shows a schematic diagram of a receive conversion system 305*a*, according to one of more exemplary embodiments of the present disclosure. In some embodiments, receive conversion system 305*a* can be utilized as receive conversion system 205*a* in FIG. 2*a*. Block 305*a* can receive a plurality of input signals 304*aa* through 304*ia*, which in some exemplary embodiments can correspond to input signals 204*aa* through 204*ia* shown in FIG. 2*a*. Each of signals 304*aa* through 304*ia* can be applied to a corresponding A/D block 315*a* through 315*i*, which can output respective digital data streams 306*aa* through 306*ai*. In some exemplary embodiments, each of digital data streams 306*aa* through 306*ai* can comprise samples of a signal received by particular antenna elements, e.g., elements 150*a* through 150*i* in FIG. 1. In some exemplary embodiments, digital data streams 306*aa* through 306*ai* can comprise data stream 206*a* shown in FIG. 2*a*. In addition, receive conversion system 305*a* can receive control signals 307*aa* through 307*ai*, each of which can be applied to a corresponding A/D block 315*a* through 315*i*. Such control signals can be provided, e.g., by a digital processor such as processor 100, and can be utilized to control various operational parameters of the respective CS block such as sampling rate, quantization resolution, enable/disable, etc.

Figure 4A:
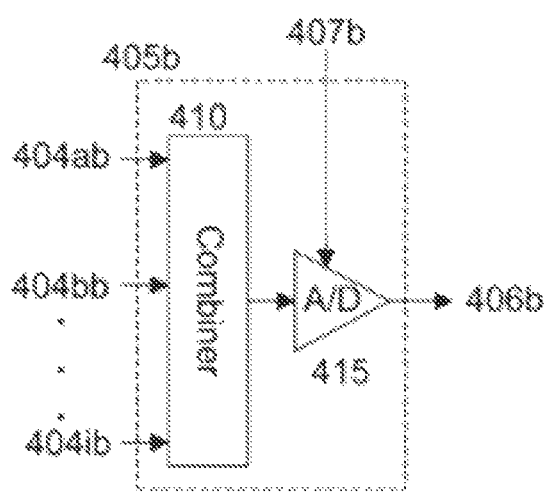
FIGS. 4a and 4b are schematic diagrams of exemplary receive and transmit conversion systems, respectively, according to one or more embodiments of the present disclosure.

FIG. 4*a* shows a schematic diagram of a receive conversion system 405*b*, according to one of more exemplary embodiments of the present disclosure. In some exemplary embodiments, receive conversion system 405*b* can be utilized as receive conversion system 205*b* in FIG. 2*a*. Block 405*b* can receive a plurality of input signals 404*ab* through 404*ib*, which in some exemplary embodiments can correspond to input signals 204*ab* through 204*ib* shown in FIG. 2*a*. Each of signals 404*ab* through 404*ib* can be applied to a combiner 410, which can output a combination of signals 404*ab* through 404*ib* to A/D block 415. Block 415 can output a signal digital data stream 406*b* comprising samples of a combined signal received by all antenna elements, e.g., elements 150*a* through 150*i* in FIG. 1. In some exemplary embodiments, digital data stream 406*b* can comprise data stream 206*b* shown in FIG. 2*a*. In addition, receive conversion system 405*a* can receive control signal 407*b* that can be utilized to control various operational parameters of A/D block 415 such as sampling rate, quantization resolution, power on/off, etc. Such control signals can be provided, e.g., by a digital processor, such as processor 100.

Figure 4B:
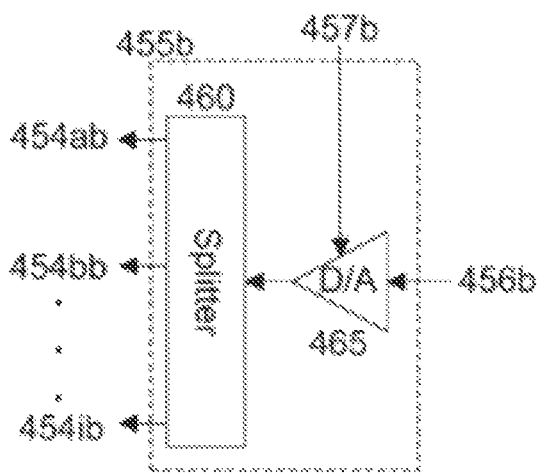

FIG. 4*b* shows a schematic diagram of a transmit conversion system (TCS) 455*b*, according to one of more exemplary embodiments of the present disclosure. In some exemplary embodiments, transmit conversion system 455*b* can be utilized as transmit conversion system 255*b* in FIG. 2*b*. TCS 455*b* can receive a digital sample stream 456*b* provided, for example, by a digital processor such as processor 100 shown in FIG. 1. In addition, TCS 455*b* can receive one or more control signals 457*b* that, in some exemplary embodiments, can be utilized to control operational parameters of D/A block 465 such as sampling rate, quantization resolution, power on/off, etc. Such control signals can be provided, e.g., by a digital processor such as processor 100. The analog output signal from D/A block 465 can be applied to a splitter 460, which splits the input signal into i output signals 454*ab* through 454*ib*, which in some exemplary embodiments can be substantially similar in power or energy level. In some embodiments, output signals 454*ab* through 454*ib* can correspond to output signals 254*ab* through 254*ib* shown in FIG. 2*b*.

Figure 5:
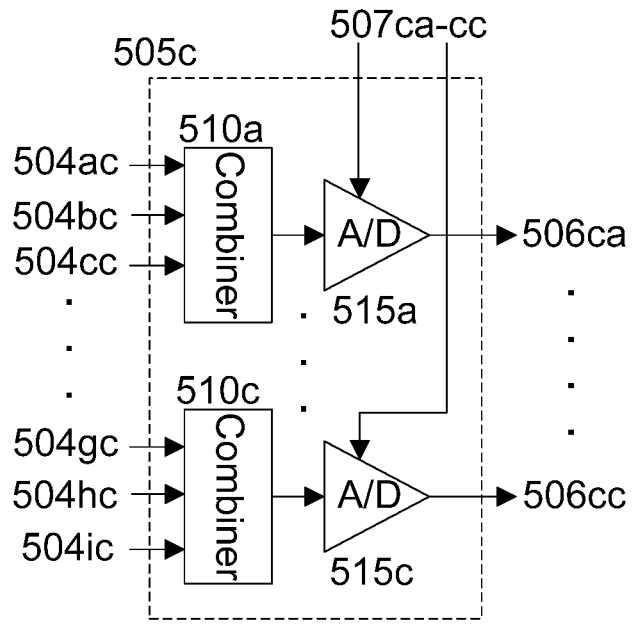
FIG. 5 is a schematic diagram of another exemplary receive conversion system, according to one or more exemplary embodiments of the present disclosure.

FIG. 5 shows a schematic diagram of a receive conversion system 505*c*, according to one of more exemplary embodiments of the present disclosure. In some exemplary embodiments, receive conversion system 505*c* can be utilized as receive conversion system 205*c* in FIG. 2*a*. Block 505*c* can receive a plurality of input signals 504*ac* through 504*ic*, which in some exemplary embodiments can correspond to input signals 204*ac* through 204*ic* shown in FIG. 2*a*. Each of signals 504*ac* through 504*ic* can be applied to one of combiners 510*a* through 510*c*. In some exemplary embodiments, equal-size subsets of signals 504*ac* through 504*ic* can be applied to each of combiners 510*a* through 510*c*. In other exemplary embodiments, any of combiners 510*a* through 510*c* can receive a different number of signals than one or more others of combiners 510*a* through 510*c*. Although three combiners 510*a* through 510*c* are shown in FIG. 5, this number is merely exemplary and the skilled person will recognize that various combinations of combiners and signals per combiner can be utilized.

Each of combiners 510*a* through 510*c* can output a combination of its input signals to a corresponding A/D block 515*a* through 515*c*. Each of these A/D blocks (e.g., 515*a*) can output a corresponding digital data stream (e.g. 506*ca*) comprising samples of the combined input signals (e.g., 504*ac* through 504*cc*). In some exemplary embodiments, each combined input signal can correspond to signals received by corresponding antenna array elements (e.g., 150*a* through 150*c* in FIG. 1). In some exemplary embodiments, digital data streams 506*ca* through 506*cc* can comprise data stream 206*c* shown in FIG. 2*a*. In addition, receive conversion system 505*c* can receive control signals 507*ca* through 507*cc*, each of which can be applied to a corresponding A/D block 515*a* through 515*c*. Such control signals can be provided, e.g., by a digital processor such as processor 100 and can be utilized to control various operational parameters of the respective A/D blocks such as sampling rate, quantization resolution, power on/off, etc.

The capabilities of the exemplary devices and/or circuits described herein with respect to FIGS. 1 through 5 can be applied, for example, in a wireless system to exploit different gain patterns and/or different antenna elements for use at different times. For example, one of the conversion systems (CS) can be configured as a high-resolution analog CS (e.g., CS 405*b* shown in FIG. 4*a*) while another of the CS can be configured as a low-resolution, fully-digital CS (e.g., CS 305*a* shown in FIG. 3). The low-resolution, fully-digital CS can be enabled during cell search and determining various directions of arrival, while the high-resolution analog CS could be enabled during steady-state data transmission and/or reception after the directions of communication are known and can be employed, e.g., for beamforming.

Figure 6:
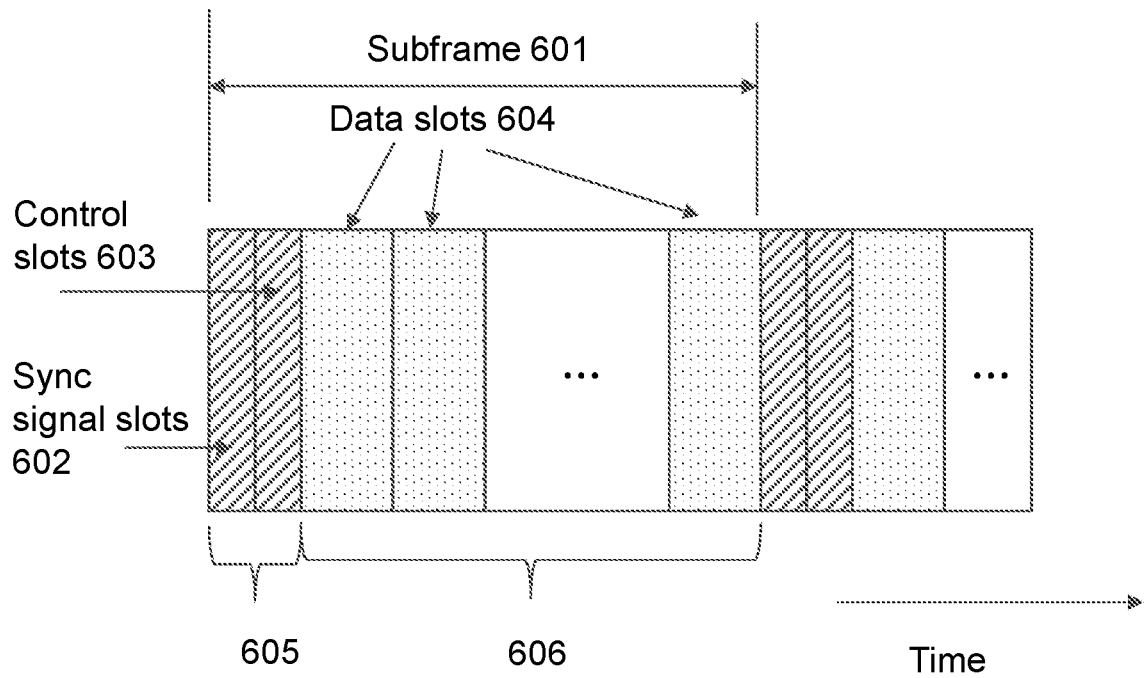
FIG. 6 is an illustration of an exemplary signal framing structure for which one of more exemplary embodiments of the present disclosure can be utilized.

FIG. 6 shows an exemplary signal framing structure for which the switchable-CS architecture described above can be utilized according to an exemplary embodiment of the present disclosure. Transmissions (e.g., from a base station to a mobile station) can be organized in repeating time intervals called subframes (e.g., subframe 601), which in some embodiments can be 1-2 milliseconds (ms) in duration. Each subframe 601 can be divided into intervals (e.g., slots) with known locations relative to the beginning of the subframe. Such slots can comprise various data and control signals such as synchronization slot 602, control slot 603 (which can comprise, e.g. ACK/NAK, CQI, channel assignments, etc.), and data slots 604. A device comprising the switchable CS architecture (e.g., the device shown in FIG. 1) can enable and/or facilitate a low-resolution CS (e.g., CS 305*a* shown in FIG. 3) during the period 605 (e.g., synchronization slot 602 and control slot 603) and a high-resolution CS (e.g., CS 405*b* shown in FIG. 4*a*) during interval 606 comprising the data slots 604. The device can enable/disable the respective CS based on the timing relative to the beginning of a subframe 601.

FIG. 10 shows a flow diagram of an exemplary method and/or procedure for operating a switchable architecture comprising first and second conversion systems (CS), according to one or more exemplary embodiments of the present disclosure. The exemplary method and/or procedure of FIG. 10 can be used in connection with the exemplary signal framing structure shown in FIG. 6 and with one or more of the various switchable-CS architecture embodiments described hereinabove. Although the exemplary method and/or procedure is illustrated in FIG. 10 by blocks in a particular order, this order is exemplary and the functions corresponding to the blocks may be performed in different orders, and can be combined and/or divided into blocks having different functionality than shown in FIG. 10.

For example, beginning in block 1000, a first duration, a second duration, and a periodicity or period of the first and second durations is determined based on predetermined characteristics of a subframe, such as the exemplary subframe shown in FIG. 6. For example, the first and second durations can be determined based on slots with known durations and locations (e.g., timing) relative to the beginning of the subframe. In addition, the periodicity can be determined based on an integer multiple (e.g., one or higher) of the subframe period. In other exemplary embodiments, however, one or more of the first duration, second duration, and periodicity can be input to the exemplary method rather than being determined in block 1000.

In block 1010, the first CS can be enabled for a first duration and the second CS can be disabled for the first duration. In block 1020, the first CS can be configured to produce samples of a signal received by the antenna system during this first duration. These samples produced by the first CS can have a first resolution. In block 1030, the second CS is enabled for a second duration and the first CS is disabled for the second duration. In block 1040, the second CS can be configured to produce samples of a signal received by the antenna system during this second duration. These samples produced by the second CS can have a second resolution that can be less than the first resolution. In block 1050, the timing of the next subframe is determined based on periodicity and durations determined in block 1000. Optionally, blocks 1010-1050 can be repeated for one or more additional subframes. According to other exemplary embodiments of the exemplary method shown in FIG. 10, it is possible to operate the exemplary method on a single subframe (e.g., without block 1050).

Figure 7:
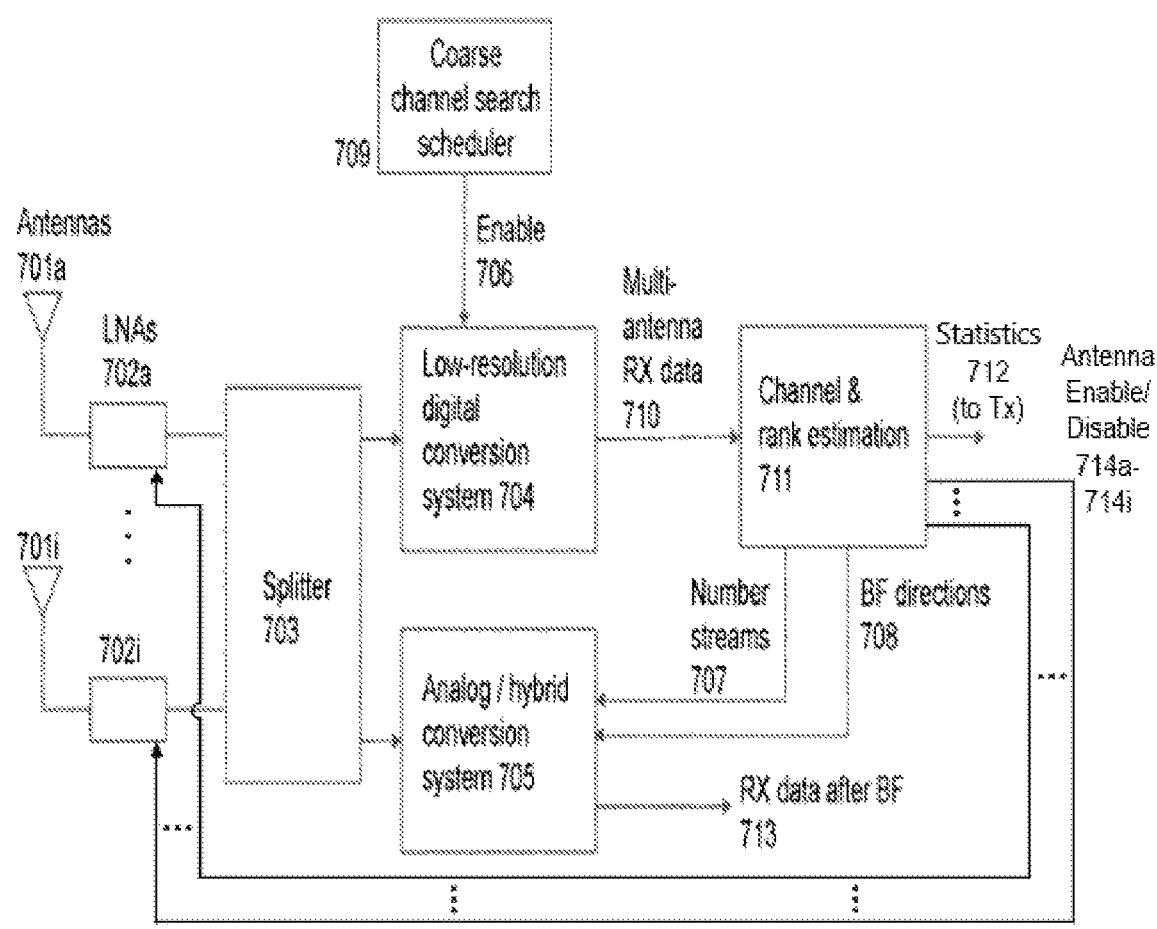
FIG. 7 is a block diagram of yet another exemplary apparatus and/or device according to one or more exemplary embodiments of the present disclosure.

FIG. 7 shows a block diagram of an exemplary receiver device incorporating other exemplary embodiments of the switchable CS architecture of the present disclosure. The receiver device shown in FIG. 7 can be employed, e.g., for periodic coarse-fine channel tracking. Similar to the manner shown and described above with reference to FIG. 1, receive signals from a plurality of antennas 701 are applied to respective LNAs 702, the outputs of which are applied to splitter 703. The outputs of splitter 703 are applied to two conversion systems: a lower-resolution digital CS 704 (e.g., CS 305*a* shown in FIG. 3) and a higher-resolution CS 705. Depending on embodiment, CS 705 can comprise an analog CS (e.g., CS 405*b* shown in FIG. 4*a*) or a hybrid CS (e.g., CS 505*c* shown in FIG. 5).

In some exemplary embodiments, lower-resolution digital CS 704 can be provided for coarse channel tracking since it can provide noisy measurements across all antenna elements. In such exemplary embodiments, coarse channel tracking scheduler 709 periodically can enable and/or facilitate the lower-resolution CS 704 using, e.g., an enable command 706. The periodicity and duration of time can be selected based on the available power, channel coherence time, and/or the presence of suitable reference signals (e.g., common reference signals, user-specific signals, etc.). Received data 710 from low-resolution CS 704 can be applied to a channel and rank estimator 711, which can be implemented using various combinations of hardware, software, firmware, programmable logic, etc. as known by persons of ordinary skill. Moreover, procedures for selection of times for channel estimation and for estimating the channel from the received data are well-known by persons of ordinary skill, e.g., in the context of 3GPP LTE receivers.

Once the channel has been estimated, beamforming weights 708 and number of streams indicator 707 can be applied to higher-resolution CS 705 by channel and rank estimator 711, and lower-resolution CS 704 can be disabled. Moreover, to the extent that one or more of the antennas used for channel and rank estimation are not used for steady-state data reception, such antennas can also be disabled during at least some of the time CS 704 is disabled. Employing a programmable number of streams in this manner can, e.g., save power when the channel rank is not sufficient to support higher numbers of spatial degrees of freedom. In some embodiments, statistics 712 (e.g., rank information, SNR, etc.) can be fed back to a transmitter, e.g., using a CQI-RI report as described in 3GPP standards.

Figure 8:
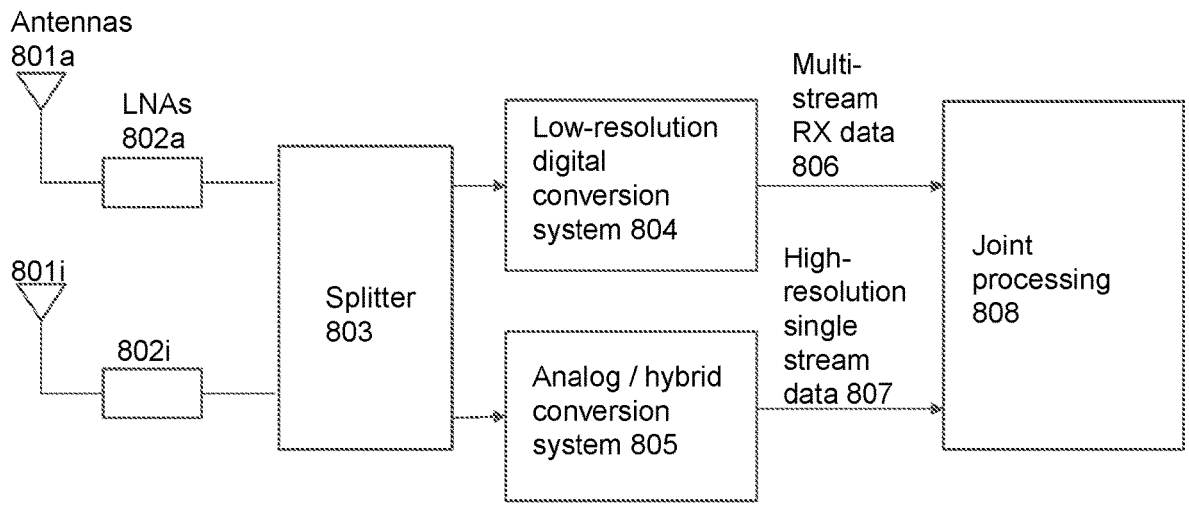
FIG. 8 is a block diagram of still another exemplary apparatus and/or device according to one or more exemplary embodiments of the present disclosure.

FIG. 8 shows a block diagram of an exemplary receiver device incorporating other exemplary embodiments of the switchable CS architecture of the present disclosure. The receiver device shown in FIG. 8 can be employed, e.g., for interference cancellation. Similar to the manner shown and described above with reference to FIG. 1, received signals from a plurality of antennas 801 are applied to respective LNAs 802, the outputs of which are applied to splitter 803. The outputs of splitter 803 are applied to two conversion systems: a lower-resolution digital CS 804 (e.g., CS 305*a* shown in FIG. 3) and a higher-resolution CS 805. Depending on embodiment, CS 805 can comprise an analog CS (e.g., CS 405*b* shown in FIG. 4*a*) or a hybrid CS (e.g., CS 505*c* shown in FIG. 5). Lower-resolution CS 804 can output data on multiple streams 806, while higher-resolution CS 805 can output samples on one or a small number of streams 807. Joint processing block 808 can combine and/or utilize signals from both CS 804 and CS 805. For example, block 808 can be configured to detect an interfering signal using the output of CS 804 and then subtract, cancel, and/or remove the detected interfering signal from the output of CS 805, thereby determining a desired signal.

FIG. 11 shows a flow diagram of an exemplary method and/or procedure for operating a switchable architecture according to one or more exemplary embodiments of the present disclosure. For example, the exemplary method/procedure can comprise and/or utilize first and second conversion systems (CS). The exemplary method and/or procedure of FIG. 11 can be used in connection with the exemplary signal framing structure shown in FIG. 6 and with one or more of the various switchable-CS architecture embodiments described herein, including the exemplary switchable-CS architecture shown in FIG. 8. Although the exemplary method and/or procedure is illustrated in FIG. 11 by blocks in a particular order, this order is exemplary and the functions corresponding to the blocks may be performed in different orders, and can be combined and/or divided into blocks having different functionality than shown in FIG. 11.

For example, beginning in block 1100, a first duration, a second duration, and a periodicity or period of the first and second durations is determined based on predetermined characteristics of a subframe, such as the subframe shown in FIG. 6. These parameters can be determined in a manner similar to that described above with respect to FIG. 10. In other exemplary embodiments, however, one or more of the first duration, second duration, and periodicity can be input to the exemplary method rather than being determined in block 1100. In block 1110, the first CS is enabled and the second CS is disabled for the first duration. The first CS can be enabled, for example, to produce samples of a signal received by an antenna system during the first duration. In block 1120, interference is detected based on signals produced by the first CS during the first duration. In block 1130, the second CS is enabled and the first CS is disabled for the second duration. The second CS can be enabled, for example, to produce samples of a signal received by an antenna system during the second duration. In block 1140, a desired signal is determined based on signals received during the second duration and the interference determined based on the first duration. In block 1150, the timing of the next subframe is determined based on periodicity and durations determined in block 1100. Optionally, blocks 1110-1150 can be repeated for one or more additional subframes. According to other exemplary embodiments of the exemplary method shown in FIG. 11, such exemplary method can operate on a single subframe (e.g., without block 1150).

Although FIG. 8 illustrates an exemplary receiver device incorporating a switchable CS architecture according to embodiments of the present disclosure, analogous architectures and procedures can be utilized in a transmitter device. For example, a signal requiring high SNR (e.g., due to the use of a higher-order modulation and coding scheme (MCS)) can be transmitted simultaneously as one or more low-rate signals (e.g., control channels) that do not require high SNR (e.g., due to use of lower-order MCS). Some exemplary scenarios can require transmitting the low-rate, low-SNR signals in one or more different directions than the high-SNR signals. In such scenarios, a first conversion system (e.g., a lower-resolution system) can be employed to generate the low-SNR signal(s) and a second conversion system (e.g., a higher-resolution system such as CS 455b shown in FIG. 4b) can be employed to generate the high-SNR signal(s), all of which can be transmitted using the plurality of antennas, e.g., configured as an antenna array.

Various exemplary embodiments of the present disclosure can also be applied to directional beamforming in mmW systems using some or all of the available antennas, including beam nulling (e.g., to lower or minimize interference and/or to maximize gain in a particular direction). Such exemplary embodiments can be adapted, configured, and/or configured to reduce A/D power consumption or resolution requirements, e.g., sigma-delta or other efficient and low resolution A/D architecture known to persons of ordinary skill. Such embodiments can be utilized in conjunction with memories that provide faster data throughput, thereby enabling and/or facilitating use with mmW systems having much greater bandwidth and/or data capacity compared to today's wireless systems.

For example, exemplary embodiments can be configured to oversample spatially, using more antenna elements than would be required by a Nyquist criterion for a particular spatial resolution, antenna gain, and/or directivity. Exemplary techniques are described in, e.g., S. V. Hum, et al., "UWB Beamforming using 2D Beam Digital Filters", IEEE Transactions on Antennas and Propagation, Vol. 57, No. 3, March 2009, pp. 804-807 and A. Madanayake, et al., "2D-IIR Time-Delay-Sum Linear Aperture Arrays", IEEE Antennas and Propagation Letters (AWPL), 2014. Moreover, although the above exemplary techniques are related to two-dimensional arrays, exemplary embodiments can also be applied to spatial oversampling with three-dimensional arrays. Such exemplary embodiments can utilize additional receiver chains and/or circuitry in conjunction with the additional antenna elements, selectively utilizing (e.g., switching) various receive circuitry as required. These exemplary embodiments utilizing spatial oversampling coupled with additional receive circuitry can be combined with conversion systems employing A/Ds (or D/As) with lower resolution (e.g., fewer bits) and/or operating at faster sampling rates. In such embodiments, the conversion systems can be configured according to factors including spatial resolution, sample rate, sample resolution, and power consumption. To summarize, such exemplary embodiments can enable and/or facilitate much greater sample rates (tens of GHz) for much wider bandwidth channels that exist today.

Figure 9:
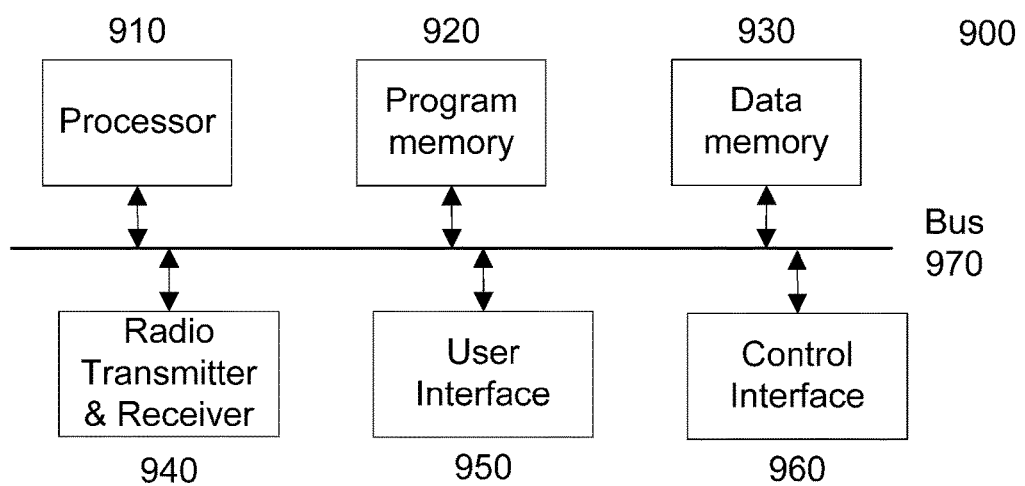
FIG. 9 is a block diagram of a further exemplary device and/or apparatus, according to one or more exemplary embodiments of the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 9 shows a block diagram of an exemplary device or apparatus utilizing certain exemplary embodiments of the present disclosure, including execution of instructions on a computer-readable medium comprising one or more exemplary methods for configuring and/or utilizing a plurality of transmit and/or receive conversion systems according to one or more of the embodiments described herein above. Exemplary device 900 can comprise a processor 910 that can be operably connected to a program memory 920 and/or a data memory 930 via a bus 970 that can comprise parallel address and data buses, serial ports, or other methods and/or structures known to those of ordinary skill in the art. Program memory 920 comprises software code or program executed by processor 910 that facilitates, causes and/or programs exemplary device 900 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1×RTT, CDMA2000, 802.11 WiFi standards, HDMI, USB, Firewire, etc., or any other current or future protocols that can be utilized in conjunction with radio transceiver 940, user interface 950, and/or host interface 960.

Program memory 920 can also comprises software code executed by processor 910 to control the functions of device 900, including configuring and controlling various components such as radio transceiver 940, user interface 950, and/or host interface 960. Program memory 920 can also comprise an application program for estimating the direction-of-arrival of an incident signal and/or adjusting the spatial selectivity of a receiver antenna array in accordance with the estimated direction of arrival, according to one or more of the embodiments described herein above. Such software code can be specified or written using any known or future developed programming language, such as e.g. Java, C++, C, Objective C, HTML, XHTML, machine code, and Assembler, as long as the desired functionality, e.g., as defined by the implemented method steps, is preserved. In addition or alternately, program memory 920 can comprise an external storage arrangement (not shown) remote from device 900, from which the instructions can be downloaded into program memory 920 located within or removably coupled to device 900, so as to enable execution of such instructions.

Data memory 930 can comprise memory area for processor 910 to store variables used in protocols, configuration, control, and other functions of device 900, including estimating the direction-of-arrival of an incident signal and/or adjusting the spatial selectivity of a receiver antenna array in accordance with the estimated direction of arrival, according to one or more of the embodiments described herein above. Moreover, program memory 920 and/or data memory 930 can comprise non-volatile memory (e.g., flash memory), volatile memory (e.g., static or dynamic RAM), or a combination thereof. Furthermore, data memory 930 can comprise a memory slot by which removable memory cards in one or more formats (e.g., SD Card, Memory Stick, Compact Flash, etc.) can be inserted and removed. Persons of ordinary skill in the art will recognize that processor 910 can comprise multiple individual processors (including, e.g., multi-core processors), each of which implements a portion of the functionality described above. In such cases, multiple individual processors can be commonly connected to program memory 920 and data memory 930 or individually connected to multiple individual program memories and or data memories. More generally, persons of ordinary skill in the art will recognize that various protocols and other functions of device 900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 940 can comprise radio-frequency transmitter and/or receiver functionality that facilitates the device 900 to communicate with other equipment supporting like wireless communication standards and/or protocols. In some exemplary embodiments, the radio transceiver 940 includes a transmitter and a receiver that enable device 900 to communicate with various Fifth-Generation (5G) networks according to various protocols and/or methods proposed for standardization by 3GPP and/or other standards bodies. In some exemplary embodiments, the radio transceiver 940 can comprise some or all of the functionality of the receiver shown in and described above with reference to FIG. 1.

In some exemplary embodiments, the radio transceiver 940 includes an LTE transmitter and receiver that can facilitate the device 900 to communicate with various Long Term Evolution (LTE) networks (also known as "4G") according to standards promulgated by 3GPP. In some exemplary embodiments of the present disclosure, the radio transceiver 940 includes circuitry, firmware, etc. necessary for the device 900 to communicate with various LTE, UMTS, and/or GSM/EDGE networks, also according to 3GPP standards. In some exemplary embodiments of the present disclosure, radio transceiver 940 includes circuitry, firmware, etc. necessary for the device 900 to communicate with various CDMA2000 networks, according to 3GPP2 standards. In some exemplary embodiments of the present disclosure, the radio transceiver 940 is capable of communicating using radio technologies that operate in unlicensed frequency bands, such as IEEE 802.11 WiFi that operates using frequencies in the regions of 2.4, 5.6, and/or 60 GHZ. In some exemplary embodiments of the present disclosure, radio transceiver 940 can comprise a transceiver that is capable of wired communication, such as by using IEEE 802.3 Ethernet technology. The functionality particular to each of these embodiments can be coupled with or controlled by other circuitry in the device 900, such as the processor 910 executing protocol program code stored in program memory 920.

User interface 950 can take various forms depending on the particular embodiment of the device 900. In some exemplary embodiments of the present disclosure, the user interface 950 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 900 can comprise a tablet computing device (such as an iPad® sold by Apple, Inc.) including a larger touchscreen display. In such embodiments, one or more of the mechanical features of the user interface 950 can be replaced by comparable or functionally equivalent virtual user interface features (e.g., virtual keypad, virtual buttons, etc.) implemented using the touchscreen display, as familiar to persons of ordinary skill in the art. In other embodiments, the device 900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 900 having a touch screen display are capable of receiving user inputs, such as inputs related to determining a direction of arrival or configuring an antenna array, as described herein or otherwise known to persons of ordinary skill in the art.

In some exemplary embodiments of the present disclosure, device 900 can comprise an orientation sensor, which can be used in various ways by features and functions of device 900. For example, the device 900 can use outputs of the orientation sensor to determine when a user has changed the physical orientation of the device 900's touch screen display. An indication signal from the orientation sensor can be available to any application program executing on the device 900, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure, as discussed in more detail above with reference to FIG. 1.

A control interface 960 of the device 900 can take various forms depending on the particular exemplary embodiment of device 900 and of the particular interface requirements of other devices that the device 900 is intended to communicate with and/or control. For example, the control interface 960 can comprise an RS-232 interface, an RS-485 interface, a USB interface, an HDMI interface, a Bluetooth interface, an IEEE 1394 ("Firewire") interface, an I²C interface, a PCM-CIA interface, or the like. In some exemplary embodiments of the present disclosure, control interface 960 can comprise an IEEE 802.3 Ethernet interface such as described above. In some exemplary embodiments of the present disclosure, the control interface 960 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 900 can comprise more functionality than is shown in FIG. 9 including, for example, a video and/or still-image camera, microphone, media player and/or recorder, etc. Moreover, radio transceiver 940 can include circuitry necessary to communicate using additional radio-frequency communication standards including Bluetooth, GPS, and/or others. Moreover, the processor 910 can execute software code stored in the program memory 920 to control such additional functionality. For example, directional velocity and/or position estimates output from a GPS receiver can be available to any application program executing on the device 900, including various exemplary methods and/or computer-readable media according to various exemplary embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. An apparatus, comprising:
a switchable architecture (SA) analog-to-digital conversion (ADC) system, comprising a plurality of different quantization resolution (QR), selectively enableable-disableable (SED) ADC systems, including at least a SED first QR ADC system and a SED second QR ADC system, wherein a first QR is lower than a second QR;
a coupler circuit configured to couple to a plurality of antenna elements, including at least a first antenna element and a second antenna element, and to couple first antenna signals from the first antenna element concurrently to the SED first QR ADC system and to the SED second QR ADC system, concurrently with coupling second antenna signals from the second antenna element concurrently to the SED first QR ADC system and to the SED second QR ADC system;
a processor, configured to
selectively configure the SA ADC system to a first QR operating architecture comprising the SED second QR ADC system disabled concurrent with the SED first QR ADC system enabled and outputting first QR samples of the first antenna signals and the second antenna signals,
selectively configure the SA ADC system to a second QR operating architecture comprising the SED first QR ADC system disabled concurrent with the SED second QR ADC system enabled and outputting second QR samples of the first antenna signals and the second antenna signals,
selectively perform a first QR sample-based processing, using the first QR samples of the first antenna signals, or the first QR samples of the second antenna signals, or both, and
selectively perform a second QR sample-based processing, using the second QR samples of the first antenna signals, or the second QR samples of the second antenna signals, or both.

2. The apparatus of claim 1, wherein the processor is further configured to:
selectively configure the SA ADC system to a joint first QR-second QR operating architecture comprising the SED first QR ADC system enabled and outputting first QR samples of the first antenna signals and of the second antenna signals, concurrent with the SED second QR ADC system enabled and outputting second QR samples of the first antenna signals and of the second antenna signals; and
while the SA ADC system is configured in the joint first QR-second QR operating architecture, to selectively perform a processing using the first QR samples of the first antenna signals, or the first QR samples of the second antenna signals, or both, and to selectively perform a processing using the second QR samples of the first antenna signals, or the second QR samples of the second antenna signals, or both.

3. The apparatus of claim 2, wherein the processor is further configured to include a joint process logic configured, while the SA ADC system is configured in the joint first QR-second QR operating architecture, to
- detect an interfering signal, using the first QR samples of the first antenna signals, or the first QR samples of the second antenna signals, or both,
- determine a desired signal by operations including one or more of subtracting, cancelling, and removing the detected interfering signal from the second QR samples of the first antenna signals, or from the second QR samples of the second antenna signals, or from both.

4. The apparatus of claim 1, wherein the processor is further configured to store a first duration and a second duration, and to selectively perform, using the first duration and the second duration, a switched architecture reception process, including to:
- configure the SA ADC system to and maintain, for the first duration, the SA ADC system in the first QR operating architecture,
- at the end of the first duration, to configure the SA ADC system to and, for the second duration, maintain the SA ADC system in the second QR operating architecture,
- perform, during the first duration, the first QR sample-based processing, using the first QR samples of the first antenna signals, or the first QR samples of the second antenna signals, or both, and
- perform, during the second duration, the second QR sample-based processing, using the second QR samples of the first antenna signals, or the second QR samples of the second antenna signals, or both.

5. The apparatus of claim 4, wherein the processor is further configured to include in the first QR sample-based processing a detecting of an interfering signal, using the first QR samples of the first antenna signals, or the first QR samples of the second antenna signals, or both, and responsive to detecting the interfering signal, to:
- terminate the first duration,
- configure the SA ADC system in the second QR operating architecture, and
- perform the second QR sample-based processing to include a determining a desired signal based on the detected interfering signal and on the second QR samples of the first antenna signals, or the second QR samples of the second antenna signals, or both.

6. The apparatus of claim 1, wherein the processor is further configured to selectively perform a coarse-fine channel tracking process, including to:
- configure the SA ADC system to the first QR operating architecture and, using the first QR samples of the first antenna signals or of the second antenna signals, or both, perform a coarse tracking process; and
- based at least in part on a result of the coarse channel tracking process, to
  - configure or update a configuration of a steady-state data reception process,
  - configure the SA ADC system to the second QR operating architecture, and
  - using the second QR samples of the first antenna signals, or of the second antenna signals, or both, perform the steady-state data reception process.

7. The apparatus of claim 6, wherein the processor is further configured to periodically configure the SA ADC system to the first QR operating architecture and to correspondingly perform the coarse tracking process, and in a corresponding periodic manner, based at least in part on the results of the periodic coarse channel tracking processes, to update the configuration of the steady-state data reception process, configure the SA ADC system to the second QR operating architecture and perform the steady-state data reception process.

8. The apparatus of claim 6, wherein
- the antenna element further comprises a third antenna element and the coupler circuit is further configured to couple third antenna signals from the third antenna element concurrently to both the SED first QR ADC system and the SED second QR ADC system;
- the coupler circuit includes a first selectively enableable antenna signal amplifier in a coupling of the first antenna element concurrently to the SED first QR ADC system and to the SED second QR ADC system, and a second selectively enableable antenna signal amplifier in a coupling of the second antenna element to the SED first QR ADC system and to the SED second QR ADC system; and
- the processor is further configured to selectively disable, based at least in part on a result of the coarse channel tracking process, the first selectively enableable antenna signal amplifier, or the second selectively enableable antenna signal amplifier, or both.

9. The apparatus of claim 8, wherein the processor is further configured such that the coarse channel tracking comprises a channel and rank estimation process and to selectively disable, based at least in part on the result of the channel and rank estimation process, the first selectively enableable antenna signal amplifier, or the second selectively enableable antenna signal amplifier, or both.

* * * * *